United States Patent
Suthar

(10) Patent No.: US 10,002,319 B1
(45) Date of Patent: Jun. 19, 2018

(54) TRANSACTION CARD HAVING AN ELECTRICALLY APPLIED COATING

(71) Applicant: Capital One Services, LLC, McLean, VA (US)

(72) Inventor: Om J Suthar, Fairfax, VA (US)

(73) Assignee: Capital One Services, LLC, McLean, VA (US)

(*) Notice: Subject to any disclaimer, the term of this patent is extended or adjusted under 35 U.S.C. 154(b) by 0 days. days.

(21) Appl. No.: 15/716,777

(22) Filed: Sep. 27, 2017

Related U.S. Application Data

(63) Continuation of application No. 15/713,222, filed on Sep. 22, 2017.
(60) Provisional application No. 62/428,455, filed on Nov. 30, 2016.

(51) Int. Cl.
*G06K 19/07* (2006.01)
*G06K 19/077* (2006.01)

(52) U.S. Cl.
CPC ... *G06K 19/0723* (2013.01); *G06K 19/07718* (2013.01); *G06K 19/07722* (2013.01)

(58) Field of Classification Search
None
See application file for complete search history.

(56) References Cited

U.S. PATENT DOCUMENTS

| | | | |
|---|---|---|---|
| 2010/0276920 A1 | 11/2010 | Woodman | |
| 2015/0115039 A1* | 4/2015 | Mosteller | G06K 19/02 235/488 |
| 2016/0171356 A1* | 6/2016 | Blum | G06K 19/02 235/488 |

OTHER PUBLICATIONS

First Action Interview Pilot Program Pre-Interview Communication for U.S. Appl. No. 15/716,739; dated Dec. 8, 2017.
First Action Interview Pilot Program Pre-Interview Communication for U.S. Appl. No. 15/713,222; dated Dec. 8, 2017.

\* cited by examiner

*Primary Examiner* — Kristy A Haupt
(74) *Attorney, Agent, or Firm* — Finnegan, Henderson, Farabow, Garrett & Dunner LLP

(57) ABSTRACT

A transaction card may comprise a first card component having an electrically conductive surface configured to receive an electrically applied coating. An electrically applied coating may be formed on the electrically conductive surface. The transaction card may be manufactured by forming a first card component having an electrically conductive surface configured to receive an electrically applied coating. The method may also include applying an electrically applied coating to the electrically conductive surface.

18 Claims, 7 Drawing Sheets

TRANSACTION CARD HAVING AN ELECTRICALLY APPLIED COATING

CROSS-REFERENCE TO RELATED APPLICATIONS

This application claims priority to U.S. Provisional Patent Application Ser. No. 62/428,455 filed Nov. 30, 2016, and is a continuation of U.S. Non-Provisional patent application Ser. No. 15/713,222 filed Sep. 22, 2017, the contents of which are hereby incorporated in their entirety.

TECHNICAL FIELD

The disclosed embodiments generally relate to a transaction card, and particularly, to a transaction card having an electrically applied coating.

BACKGROUND

This application claims priority to U.S. Provisional Patent Application Ser. No. 62/428,455 filed Nov. 30, 2016, and is a continuation of U.S. Non-Provisional patent application Ser. No. 15/713,222 filed Sep. 22, 2017, the contents of which are hereby incorporated in their entirety.

Transaction cards, such as credit and debit cards, have increasingly become a primary means for customers to engage in financial transactions. Typically, transaction cards are formed of plastic material. For example, a typical credit card may be manufactured out of PVC plastic using extrusion molding and lamination processes. The plastic card may then be modified to add functional and/or visual features. For example, a magnetic strip may be affixed to one side, the card may be stamped with the card number and customer name, and color or a design may be added for appearance.

Typical materials used to manufacture transaction cards (e.g., PVC plastic) may result in cards that are not very durable, are prone to scratching, wearing, and layer separation, and lack visual and/or tactile appeal. Typical transaction cards may also be limited in terms of how they are constructed, their achievable mechanical properties, and their ability to achieve stylistic variability. For instance, transaction cards of varying weight, color, texture, style, shape, thickness, flexibility, rigidity, density, and other physical properties may be desired, but traditional transaction cards may be limited in how variations of these features can be achieved. Therefore, an improved transaction card that enables the use of various construction designs, manufacturing processes, and materials is highly desirable.

The present disclosure addresses one or more of the problems set forth above and/or other problems associated with conventional transaction card constructions.

SUMMARY

The disclosed embodiments relate to a transaction card having an electrically conductive surface configured to receive an electrically applied coating.

A transaction card may comprise a first card component having an electrically conductive surface configured to receive an electrically applied coating. An electrically applied coating may be formed on the electrically conductive surface.

In another aspect, the first component of the transaction card may have an electrically conductive material applied to a substrate. The electrically conductive material applied may be a metal plating, an electrically conductive foil, a printed conductive ink, or an electrically conductive ink. The electrically applied coating formed on the electrically conductive surface may be an electrostatically applied coating, an electrophoretic deposition coating, an electroplated coating, an anodized coating, or a powder coated layer. The transaction card may further include a coating layer disposed on the electrically applied coating. The coating layer may be a non-opaque electrically applied material.

In another aspect, the substrate can be an electrically conductive substrate material or an electrically non-conductive material. The substrate can be metal or plastic.

In some aspects, the electrically conductive surface of the first card component may define a first outer surface of the transaction card. The transaction card can also include a second card component separate from the first card component. The second card component may define a second outer surface of the transaction card. The first and second card components may comprise the same material or may comprise different materials.

The transaction card may include, in some aspects, a data storage component. The data storage component may comprise an EMV chip or a magnetic strip. The transaction card can further include an aperture. The aperture can be configured to enable communication between the data storage component and an associated device. The magnetic strip may be joined to the second card component. The second card component may be configured to enable the data storage component to communicate with an associated device external to the transaction card.

In another aspect, the transaction card can include a first card component that is configured to be joined to the second card component. The first card component may have a first electrically conductive surface and the second card component may have a second electrically conductive surface. In some aspects, the first card component may comprise metal and the second card component may comprise plastic. In other aspects, the first card component may be formed of a first material and the second card component may be formed of a second material that is different from the first material. The first material may be electrically conductive while the second material may be electrically non-conductive. The second material may comprise plastic, wood, fabric, rubber, or ceramic.

The transaction card may further include a lip section formed on a portion of the first card component. The transaction card may further include a second lip section formed on a portion of the second card component. The transaction card may further include an adhesive layer between the first card component and the second card component.

In other aspects, the transaction card can further include a first electrically applied coating formed on the first electrically conductive surface, and a second electrically applied coating formed on the second electrically conductive surface. The first electrically applied coating may have a first electrically conductive material while the second electrically applied coating may have a second electrically conductive material that is different from the first electrically conductive material.

Consistent with another embodiment, a transaction card is provided. The transaction card may include a first card component defining a first side of the transaction card and a second card component joined to the first card component and defining a second side of the transaction card. The first card component may further include an electrically conductive surface configured to receive an electrically applied coating. The electrically applied coating may be formed on the electrically conductive surface of the first card component. The transaction card can further include a data storage component. In some aspects, at least one of the first or second card components is configured to enable communication between the data storage component and another device.

In another aspect, the first and second card components may be configured to at least partially define an interior cavity of the transaction card. The data storage component may be disposed at least partially within the interior cavity.

Consistent with another embodiment, a method of manufacturing a transaction card is provided. The method may include forming a first card component having an electrically conductive surface. The electrically conductive surface may be configured to receive an electrically applied coating. The method may further include applying an electrically applied coating to the electrically conductive surface.

In another aspect, the method may include forming the first card component by applying an electrically conductive material to a substrate. Applying the electrically conductive material to the substrate may be applying a metal plating to the substrate, applying an electrically conductive foil to the substrate, applying a printed conductive ink to the substrate, or applying an electrically conductive paint to the substrate. Applying the electrically applied coating may comprise applying an electrostatically applied coating, applying an electrophoretic deposition coating, applying an electroplated coating, applying an anodized coating, or applying a powder coated layer. The method may further include providing a coating layer on the electrically applied coating. Providing the coating layer on the electrically applied coating may comprise applying a non-opaque electrically applied material on the electrically applied coating.

In another aspect, the substrate can be an electrically conductive substrate material or an electrically non-conductive material. The substrate can be metal or plastic.

In some aspects, the electrically conductive surface of the first card component may define a first outer surface of the transaction card. The transaction card can also include a second card component separate from the first card component. The second card component may define a second outer surface of the transaction card. The first and second card components may comprise the same material or may comprise different materials.

The transaction card may include, in some aspects, a data storage component. The data storage component may comprise an EMV chip or a magnetic strip. The transaction card can further include an aperture. The aperture can be configured to enable communication between the data storage component and an associated device. The data storage component may further include a magnetic strip joined to the second card component. The second card component may be configured to enable the data storage component to communicate with an associated device external to the transaction card.

In another aspect, the method can further include joining a first card component to the second card component together. The first card component may have a first electrically conductive surface and the second card component may have a second electrically conductive surface. In some aspects, the first card component may comprise metal and the second card component may comprise plastic. In other aspects, the first card component may be formed of a first material and the second card component may be formed of a second material that is different from the first material. The first material may be electrically conductive while the second material may be electrically non-conductive. The second material may comprise plastic, wood, fabric, rubber, or ceramic.

The method may further include forming a lip section on a portion of the first card component. The method may further include forming a second lip section on a portion of the second card component. The method may further include forming an adhesive layer between the first card component and the second card component.

In other aspects, the method can further include forming a first electrically applied coating on the first electrically conductive surface, and forming a second electrically applied coating on the second electrically conductive surface. The first electrically applied coating may have a first electrically conductive material while the second electrically applied coating may have a second electrically conductive material that is different from the first electrically conductive material.

Consistent with another embodiment, a method of manufacturing a transaction card is provided. The method may include forming a first card component defining a first side of the transaction card and a second card component joined to the first card component and defining a second side of the transaction card. The first card component may further include an electrically conductive surface configured to receive an electrically applied coating. The electrically applied coating may be formed on the electrically conductive surface of the first card component. The method can further include providing a data storage component. In some aspects, at least one of the first or second card components is configured to enable communication between the data storage component and another device.

In another aspect, the first and second card components may be configured to at least partially define an interior cavity of the transaction card. The data storage component may be disposed at least partially within the interior cavity.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

The term "transaction card," as used herein, may refer to any physical card, card-like product, or similar article that is configured to store, transmit, and/or receive information, such as financial information (e.g., card numbers, account numbers, etc.), quasi-financial information (e.g., rewards balance, discount information, etc.) and/or individual-identifying information (e.g., name, address, etc.). Examples of transaction cards include credit cards, debit cards, gift cards, rewards cards, frequent flyer cards, merchant-specific cards, discount cards, identification cards, and driver's licenses, but are not limited thereto.

The physical properties of the transaction card (e.g., size, flexibility, location of various components included in the card) may meet the various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (length) by 53.98 mm (width) by 0.76 mm (thickness), as specified in ISO/IEC 7810.

Figure 1:
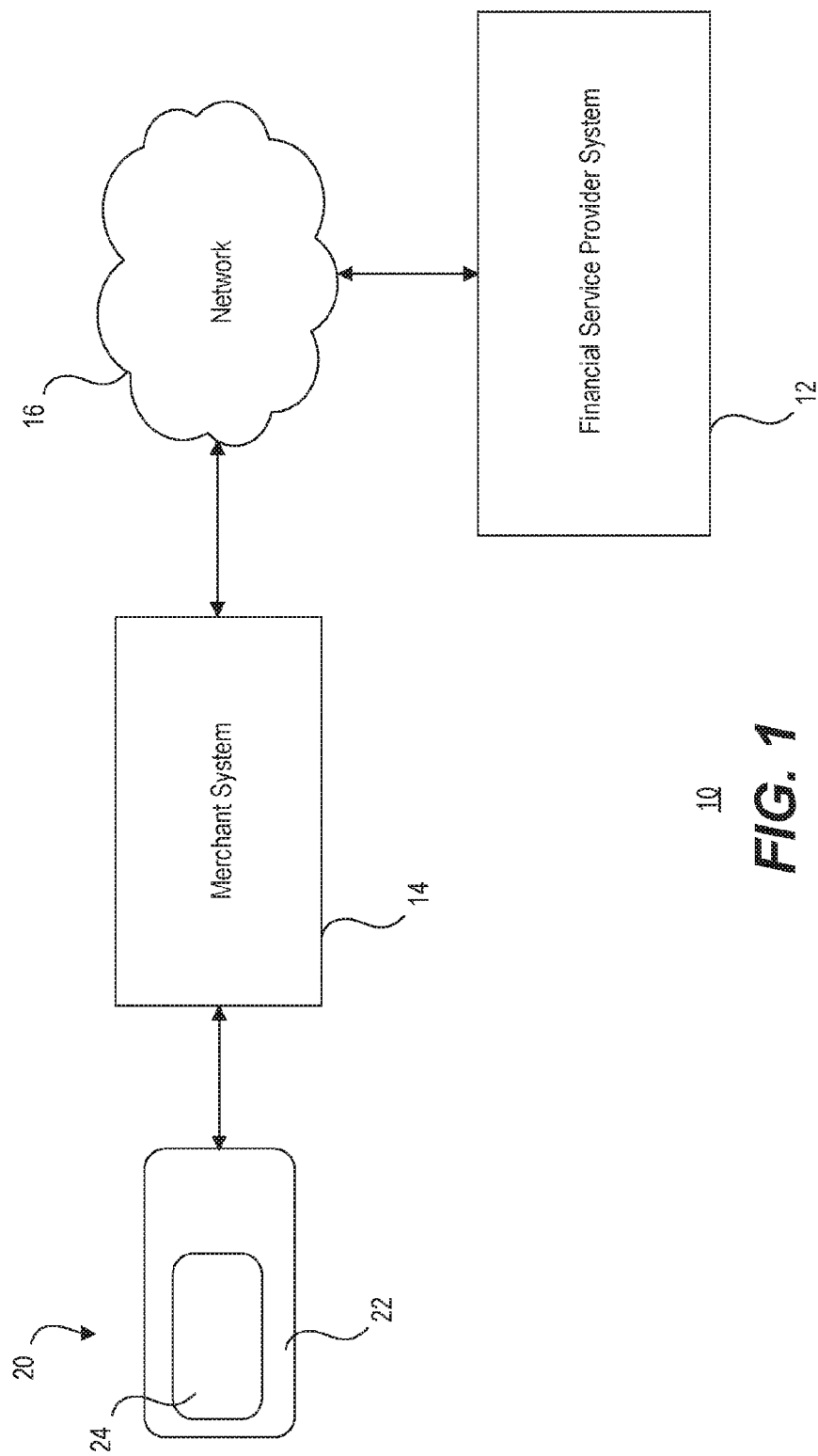
FIG. 1 is a schematic illustration of an exemplary transaction system, consistent with disclosed embodiments.

FIG. 1 illustrates an exemplary transaction system 10. Transaction system 10 may be a computing system configured to receive and send information between the components of transaction system 10 and with components outside of system 10. Transaction system 10 may include a financial service provider system 12 and a merchant system 14 connected by a network 16. It should be understood, however, that transaction system 10 may include additional and/or alternative components.

Financial service provider system 12 may be one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service account. Financial service accounts may be associated with physical financial service transaction cards, such as a credit or debit cards that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online.

Merchant system 14 may be one or more computer systems associated with a merchant. For example, merchant system 14 may be associated with an entity that provides goods and/or services (e.g., a retail store). The merchant may include brick-and-mortar location(s) that a customer may physically visit and purchase goods and services. Such physical locations may include computing devices (e.g., merchant system 14) that perform financial service transactions with customers (e.g., POS terminal(s), kiosks, etc.). Additionally or alternatively, merchant system 14 may be associated with a merchant who provides electronic shopping mechanisms, such as a website or a similar online location that consumers may access using a computer through browser software, a mobile application, or similar software. Merchant system 14 may include a client device, such as a laptop computer, desktop computer, smart phone, or tablet, that a customer may operate to access the electronic shopping mechanism.

Network 16 may be any type of network that facilitates communications and data transfer between components of transaction system 10, such as, for example, financial service provider system 12 and merchant system 14. Network 16 may include but is not limited to a Local Area Network (LAN), a Wide Area Network (WAN), such as the Internet, and may be a single network or a combination of networks. Network 16 is not limited to the above examples and transaction system 10 may implement any type of network that allows the entities (shown and not shown) of transaction system 10 to exchange data and information.

Transaction system 10 may be configured to conduct a transaction associated with the use of a transaction card 20. In one example, financial service provider system 12 may provide transaction card 20 to a customer for use in conducting transactions associated with a financial service account held by the customer. In an example of one such transaction, the customer may use transaction card 20 at a merchant location to make a purchase. During the course of the purchase, information may be transferred from transaction card 20 to merchant system 14 (e.g., a point of sale device). Merchant system 14 may communicate with financial service provider system 12 via network 16 to complete the transaction. For example, merchant system 14 may receive account information from transaction card 20. Merchant system 14 may transmit the account information and a purchase amount, among other transaction information, to financial service provider system 12. Financial service provider system 12 may settle the transaction by transferring funds from the customer's financial service account to a financial service account associated with the merchant.

For example, in some embodiments, transaction card 20 may include data storage component(s) 24 disposed in a card frame 22. As used herein, "data storage component(s)" may be or include one or more devices configured to receive, store, process, provide, transfer, send, delete, and/or generate data or other information. For example, data storage component(s) 24 may include a microchip (e.g., EMV chip), a communication device (e.g., Near Field Communication (NFC) antenna, radiofrequency identification (RFID) device, Bluetooth® device, WiFi device), a magnetic strip, a barcode, a Quick Response (QR) code, and/or other devices. Data storage component(s) 24 may be configured to store information in a computer-readable format. For example, data storage components) 24 may be configured to store information in a format that can be read by merchant system 14, transmitted over network 16, and read or processed by financial service provider system 12 (referring to FIG. 1).

While transaction system 10 and transaction card 20 are depicted and described in relation to transactions that involve customers, merchants, and financial service providers, it should be understood that these entities are used only as an example to illustrate one environment in which transaction card 20 may be used. It should be understood that transaction card 20 is not limited to financial products and may be any physical card product that is configured to receive, store, and/or transmit information. For example, transaction card 20 may be an identification card configured to provide information for identifying the holder of the card (e.g., driver's license).

Figure 2A:
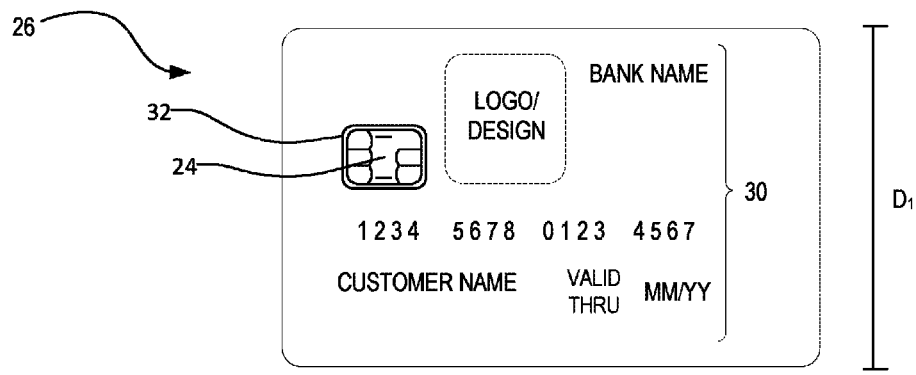
FIG. 2A is a front view illustration of an exemplary transaction card, consistent with disclosed embodiments.
Figure 2B:
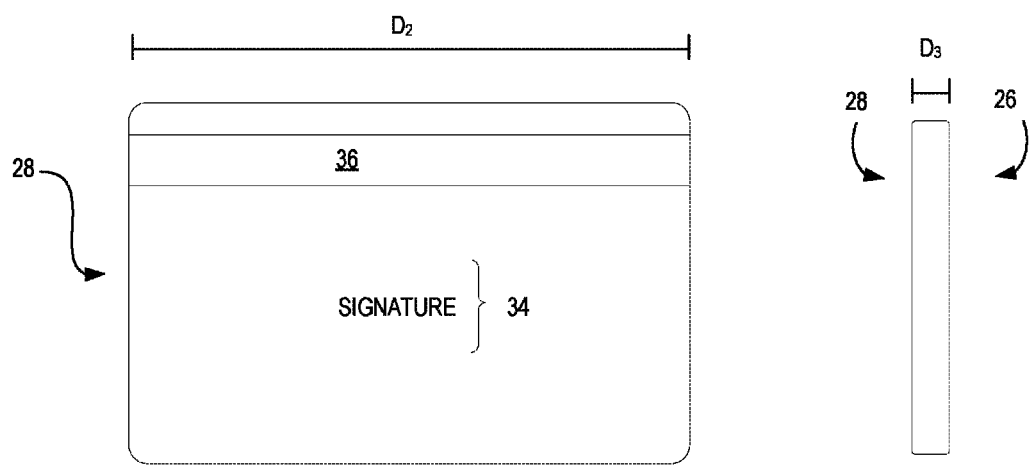
FIG. 2B is a rear view illustration of the transaction card of FIG. 2A.
Figure 2C:
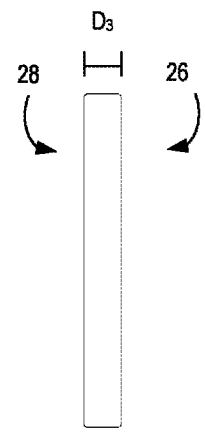
FIG. 2C is a side view illustration of the transaction card of FIGS. 2A and 2B.

FIGS. 2A-2C show front-, rear-, and edge-view illustrations, respectively, of an exemplary embodiment of transaction card 20. The front-view illustration of FIG. 2A shows a first side 26 (e.g., a front side) of card 20, and the rear-view illustration of FIG. 2B shows a second side 28 (e.g., a rear side) of card 20 opposite the first side 26. That is, first side 26 may face a first direction outward from a center of card 20, and second side 28 may face a second direction outward from the center of card 10 such that the second direction is generally opposite the first direction. For example, card 10 may have a three-dimensional structure with a first dimension $D_1$ (e.g., a width), a second dimension $D_2$ (e.g., a length), and a third dimension $D_3$ (e.g., a thickness), wherein the first side 26 and second side 28 of card 10 are separated by at least one of $D_1$, $D_2$, and $D_3$. As shown in FIG. 2C, first and second sides 26 and 28 of card 20 are separated by $D_3$, (e.g., a thickness of card 20). It is noted that card 20 is not limited to rectangular shapes and designs, and that dimensions $D_1$, $D_2$, and $D_3$ may vary with respect to one another such that card 20 may resemble a different shape.

As shown in FIG. 2A, first side 26 of card 20 may include visible information 30. Visible information 30 may include, for example, personal information, such as information that is associated with a card, a user of the card, or information relating to an account associated with the card or card user. In some embodiments, visible information 30 may include "transaction information," such as financial information (e.g., card numbers, account numbers, expiration dates etc.), individual-identifying information (e.g., name, address, signature, etc.), bank information, and/or transaction network information, logos, designs, graphics, and/or other information. As will be explained below, visible information 30 may be disposed on a surface of card 20 to enable information to be visible from first side 26 of card 20. In other embodiments, visible information 30 may also or alternatively be disposed on a surface of card 20 to enable information to be visible from another side of card 20, such as second side 28.

Data storage component(s) 24 may also be visible, exposed, or otherwise accessible (e.g., visually, mechanically, or electronically) from first side 26 of card 20. For example, data storage component(s) 24 (e.g., an EMU chip) may be accessible through an aperture 32 (shown in FIG. 2A), recess, or other type of opening on first side 26 of card 20. In some embodiments, data storage component(s) 24 and aperture 32 may be located on a different side of card 20, such as second side 28. In other embodiments, first side 26 of card 20 may not include data storage component(s) 24 or aperture 32.

As shown in FIG. 2B, visible information 34 may be disposed on and/or visible from second side 28 of card 20. Visible information 34 may include the same or different information with respect to visible information 30 (referring to FIG. 2A). For example, visible information 34 may include a signature, a code number, contact information, a serial number, a hologram, manufacturer information, and/or other information.

Data storage component(s) 36 (e.g., a magnetic strip) may be visible from, disposed on, or otherwise accessible (e.g., visually, mechanically, or electronically) from second side 28 of card 20. Although data storage component(s) 36 is/are shown in FIG. 2B as extending along dimension $D_2$ (e.g., a length of card 20), it is understood that data storage component(s) 36 may extend along a different dimension (e.g., $D_1$) or multiple dimensions. In some embodiments, second side 28 of card 20 may not include data storage component(s) 36. In other embodiments, data storage component(s) 36 may be included on first side 26 of card 20.

Figure 3:
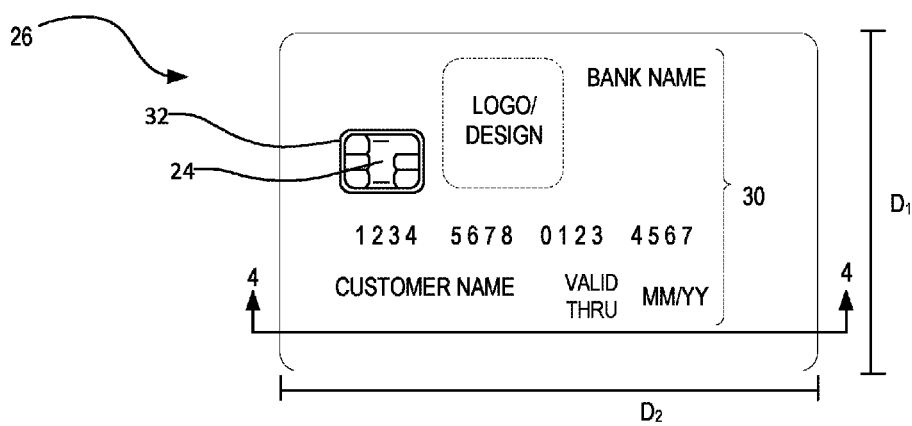
FIG. 3 is a front view illustration of an exemplary transaction card, consistent with disclosed embodiments.
Figure 4A:
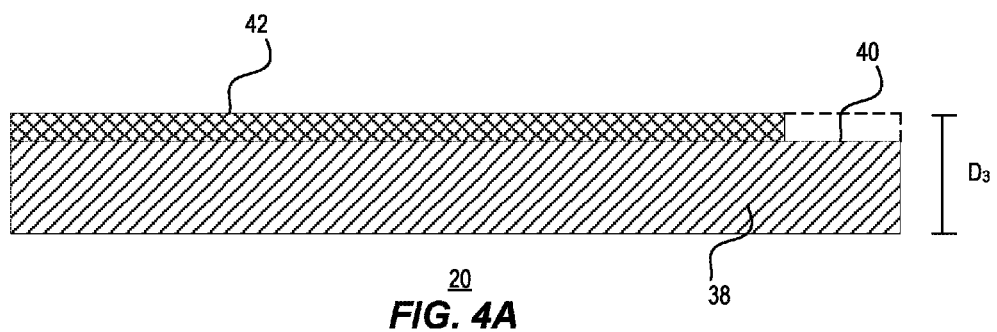
FIG. 4A is a cross-sectional view illustration along line 4-4 of FIG. 3.

FIG. 3 shows the card 20 of FIGS. 2A-2C with section line 4-4. FIG. 4A shows a partially cut-away cross section of one embodiment of card 20 taken along section line 4-4. As shown in the embodiment of FIG. 4A, card 20 may include a first card component 38 having an electrically conductive surface 40 defining a first outer surface and an electrically applied coating 42 disposed on electrically conductive surface 40. In some embodiments, first card component 38 may be formed of an electrically conductive material that provides electrically conductive surface 40.

For example, electrically conductive materials may include, but are not limited to, metals (e.g., pure metals), metal alloys, metal-containing materials (i.e., materials that contain a metal or metal alloy and a non-metal material), and other materials capable of conducting electricity sufficiently for purposes of receiving an electrically applied coating. Electrically applied coatings may include materials for coating a surface that are applied to the surface by positively or negatively charging the coating material and/or the surface to which the coating material is applied.

Electrically conductive materials from which first card component 38 may be formed include, but are not limited to, for example, aluminum, aluminum alloys, steel (e.g., carbon steel, steel alloys, stainless steel, etc.), copper, nickel, chromium, gold, silver, titanium, platinum, cadmium, tungsten, tin, lead, other metals, and/or combinations thereof (e.g., alloys, layered combinations, etc.). Electrically conductive materials, such as those mentioned above and/or others, may vary in terms of electrical properties (e.g., conductivity, resistivity, etc.), mechanical properties (e.g., rigidity, strength, hardness, elasticity, flexibility, toughness, density, etc.), cost, and appearance, among other factors. To achieve desired mechanical properties while ensuring card 20 complies with cost limitations and/or dimensional limitations or standards (e.g., ISO standards), the use of certain materials of desirable visual or tactile qualities to form first card component 38 may not be possible or feasible.

To enable greater variability in visual and tactile qualities of card 20 while ensuring card 20 complies with mechanical, dimensional, and cost requirements, first card component 38 may be formed of an electrically conductive material that satisfies the mechanical, dimensional, and cost limitations of card 20 while permitting a broad range of various surface modifications to be made for achieving desired visual and/or tactile qualities. For example, first card component 38 may be formed of a material that satisfies the dimensional and mechanical requirements of card 20, which is also electrically conductive for purposes receiving an electrically applied coating. In this way, electrically conductive surface 40 may be modified by the application of electrically applied coating 42 to achieve functional, visual and/or tactile qualities that are different from the natural functional, visual or tactile qualities of electrically conductive surface 40. In this way, first card component 38 at electrically conductive surface 40 may exhibit the functional, visual and/or tactile qualities of other materials, such as materials that are too expensive and/or are mechanically insufficient to comply with the dimensional or other mechanical requirements of card 20.

In other words, electrically conductive materials that are less expensive, more abundant, and which have more preferred mechanical properties than other materials can be used as a base which may be modified on an exterior surface to present different properties, such as more expensive, rarer, and less mechanically desirable materials (but which may have desirable visual or tactile properties). As will be explained below, the use of less expensive and more abundant materials having desirable mechanical properties may allow for a standardized process of manufacturing transaction cards with widely varying visual and tactile properties from a single type or narrow selection of construction materials. Additionally, the manufacturing process can be simplified and streamlined, as it may be tailored to producing cards from a single type or narrow selection of materials, thereby eliminating a need to incorporate different or additional process steps for accommodating the use of different or special materials.

As mentioned above, electrically conductive materials from which first card component 38 may be formed include, but are in no way limited to, for example, aluminum, aluminum alloys, steel (e.g., carbon steel, steel alloys, stainless steel, etc.), copper, nickel, chromium, gold, silver, titanium, platinum, cadmium, tungsten, tin, lead, other metals, and/or combinations thereof (e.g., alloys, layered combinations, etc.). For example, in some non-limiting embodiments, first card component 38 may be formed of, for example, steel, such as stainless steel. Under certain market conditions, stainless steel may be an economically advantageous material from which to form first card component 38 due to its comparatively lower cost, greater availability, heightened corrosion resistance, desirable mechanical properties, and suitability for receiving an electrically applied coating, in comparison to other materials. Various grades of stainless steel may be used to form first card component 38. A non-limiting example of stainless steel that may be used to form first card component 38 is SUS-94 stainless steel.

In other non-limiting embodiments, aluminum alloys may be used to form first card component 38. Similar to stainless steel, aluminum alloys may be economically advantageous under certain market conditions due to their comparatively low cost, desirable mechanical properties, and suitability for receiving electrically applied coatings, in comparison to other materials. Several different types or grades of aluminum alloys may be used to form first card component 38. Although stainless steel and aluminum alloys may be mentioned herein for purposes of discussion as exemplary materials from which first card component may be formed, it is to be understood that any of the above mentioned materials, or other electrically conductive materials consistent with this disclosure, may be used.

Electrically applied coatings may include materials for coating a surface that are applied to the surface by positively or negatively charging the coating material and/or the surface to which the coating material is applied. Electrically applied coatings may include, but are not limited to, electroplated coatings, anodized coatings, powder coated coatings, electrostatically applied coatings, electrophoretic deposition coatings (e.g., electrocoating, cathodic electrodeposition, anodic electrodeposition, electrophoretic painting, etc.), and/or other types of coatings. Thus, electrically applied coating 42 may be formed of any type of coating material that can be applied using these or other types of coating or material deposition processes. For example, electrically applied coating 42 may be formed of an applied metal or metal alloy, a metal oxide (e.g., anodic or cathodic layer), an electrostatically applied material, such as a thermoplastic or thermoset polymer (e.g., polyester, polyurethane, polyester-epoxy, fusion bonded epoxy, acrylics, etc.), and/or other materials. Other types of electrically applied coatings may be used.

Figure 4B:
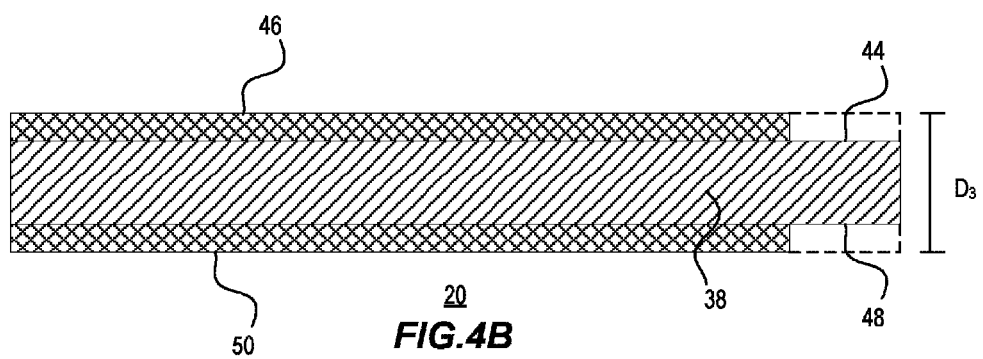
FIG. 4B is another cross-sectional view illustration along line 4-4 of FIG. 3.

In some embodiments, multiple sides of card 20 may be provided with an electrically applied coating. For example, FIG. 4B shows a partially cut-away cross section of another exemplary embodiment of card 20 taken along section line 4-4 of FIG. 3. As shown in the example of FIG. 4B, first card component 38 of card 20 may have a first electrically conductive surface 44 defining a first outer surface and a first electrically applied coating 46 disposed on first electrically conductive surface 44. First card component 38 may also include a second electrically conductive surface 48 defining a second outer surface and a second electrically applied coating 50 disposed on second electrically conductive surface 48. As shown in FIG. 4, first card component 38 may be formed of an electrically conductive material that provides first and second electrically conductive surfaces 44 and 48.

In some embodiments consistent with the example of FIG. 4B, first and second electrically applied coatings 46 and 50 may be the same type of electrically applied coating. That is, in some embodiments, first and second electrically applied coatings 46 and 50 may be formed of the same material using the same process. In other embodiments, first and second electrically applied coatings 46 and 50 may be different materials and/or types of electrically applied coatings. That is, first and second electrically applied coatings 46 and 50 may be formed of different materials and/or may be deposited using different application processes. In this way, one or more of the above-mentioned types of electrically applied coatings may be deposited onto card 20. As a result, various combinations of different electrically applied coatings providing different levels of wear resistance, mechanical properties, electrical properties, tactile responses, appearances, etc., can be achieved where desired on a single card.

For example, one side of card 20 may be coated with a shiny, lustrous, polished, glossy, or other type of smooth, slick, or relatively lower-friction surface, while another side of card 20 may be coated with a material providing a relatively higher-friction surface. In this way, desired visual or tactile qualities may be achieved on one side of card 20, while another side of card 20 may be configured to resist slipping or sliding off of a surface our out of an enclosed space, such as from within a wallet or card sleeve or pocket, or from between a user's hands, fingers, or gloves. As a result, instances of a card being dropped, misplaced, lost, etc., may be avoided.

Figure 5:
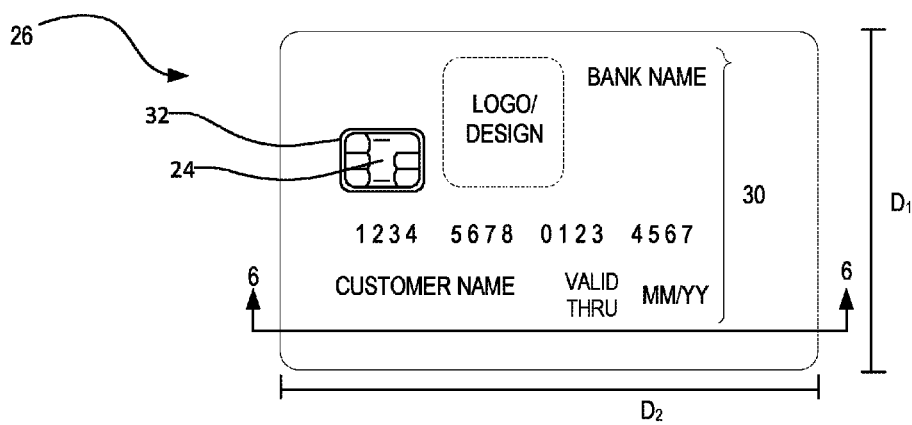
FIG. 5 is a front view illustration of an exemplary transaction card, consistent with disclosed embodiments.
Figure 6A:
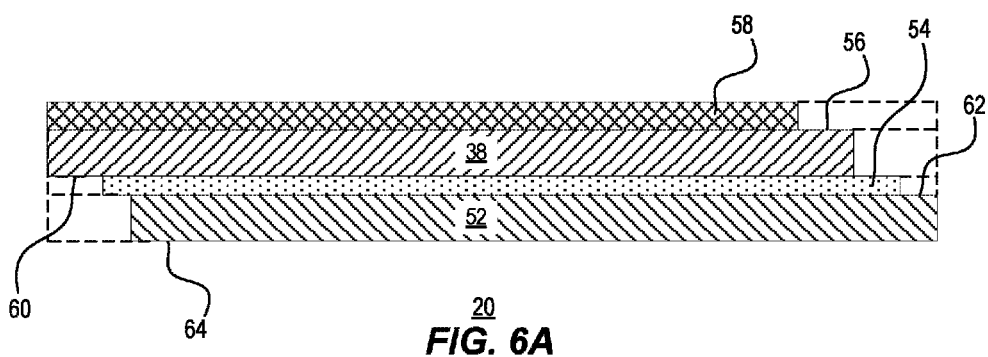
FIG. 6A is a cross-sectional view illustration along line 6-6 of FIG. 5.

In some embodiments, card 20 may include multiple card components, each having an electrically applied coating. FIG. 5 shows a front view of card 20 with section line 6-6. FIG. 6A shows a partially cut-away cross section of an exemplary embodiment of card 20 taken along section line 6-6 of FIG. 5. As shown in the example of FIG. 6A, card 20 may include first card component 38 and a second card component 52 attached to first card component 38. First and second card components 38 and 52 may be joined by an adhesive layer 54. In other embodiments, first and second card components may be joined using a different mechanism, such as lamination, fasteners, snap-fit features, interconnecting features, and/or other types of joining techniques.

As shown in FIG. 6A, first card component 38 of card 20 may have a first electrically conductive surface 56 defining a first outer surface and a first electrically applied coating 58 disposed on first electrically conductive surface 56. First card component 38 may also have a first inner surface 60 configured to be joined to second card component 52, for example via adhesive layer 54. Second card component 52 may include a second inner surface 62 and a second outer surface 64 opposite second inner surface 62. Second inner surface 62 of second card component 52 may be configured to be joined to first card component 38, for example, via adhesive layer 54. As shown in FIG. 6A, first card component 38 may be formed of an electrically conductive material that provides first electrically conductive surface 56.

In the embodiment of FIG. 6A, first and second card components 38 and 52 may be formed of the same or different materials. For example, first card component 38 may be formed of an electrically conductive material (such as those described above), and second card component 52 may be formed of an electrically conductive or electrically non-conductive material. In this way, a desired cost and overall mechanical performance (e.g., rigidity, elasticity, weight, density, strength, toughness, etc.) of card 20, which may not be achievable using only one type of material or by selecting from a limited set of materials, may be achieved.

For example, in some embodiments, first card component 38 may be electrically conductive and formed of a thin sheet (i.e., thinner than second card component 52) that is sufficient to enable the application of electrically applied coating 58 while reducing material costs. Second card component 52 may be thicker than first card component and formed of a more cost effective material having mechanical properties that, when combined with those of first card component 38, achieve desired overall mechanical properties of card 20. For example, second card component 52 may be formed of a metal, metal alloy, injection molded or compression molded plastic, wood (i.e., natural wood) or wood-containing material (i.e., materials that contain natural wood and/or other non-wood components), epoxy, fabric, rubber, ceramic, etc., but is not limited thereto.

Figure 6B:
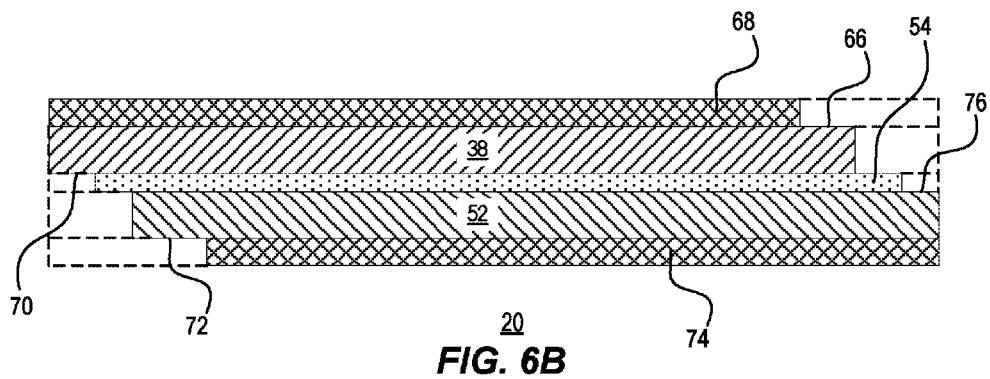
FIG. 6B is another cross-sectional view illustration along line 6-6 of FIG. 5.

In other embodiments, first and second card components 38 and 52 may each include or be coated with an electrically applied coating. For example, as shown in FIG. 6B, first card component 38 may have a first electrically conductive surface 66 and a first electrically applied coating 68 disposed on first electrically conductive surface 66. First card component 38 may also have a first inner surface 70 configured to be joined to second card component 52, for example via adhesive layer 54. Second card component 52 may have a second electrically conductive surface 72 and a second electrically applied coating 74 disposed on second electrically conductive surface 72. Second card component 52 may also have a second inner surface 76 configured to be joined to first card component 52, for example via adhesive layer 54. As shown in FIG. 6B, first card component 38 may be formed of an electrically conductive material that provides first electrically conductive surface 66, and second card component 52 may be formed of an electrically conductive material that provides second electrically conductive surface 72.

First and second card components 38 and 52 may be formed of the same or different electrically conductive materials, such as the same one or a combination of different electrically conductive materials described above. Further, first and second electrically applied coatings 68 and 74 may be the same or different types of electrically applied coatings, such as the same one or a combination of different coatings described above. The embodiment of FIG. 6B may enable first and second card components 38 and 52 to be prepared or manufactured separately, which may allow first and second card components to be more efficiently coated using different application processes. That is, while first card component 38 is being coated with first electrically applied coating 68 using a first coating process, second card component 52 may be coated with second electrically applied coating 74 using a different process, which may require the use of different equipment or may take place at a different facility or different location within a facility. Thus, downtime and cost can be reduced by allowing both components to be formed separately and simultaneously. Once coated, first and second card components 38 and 54 can be joined to form card 20.

Figure 7:
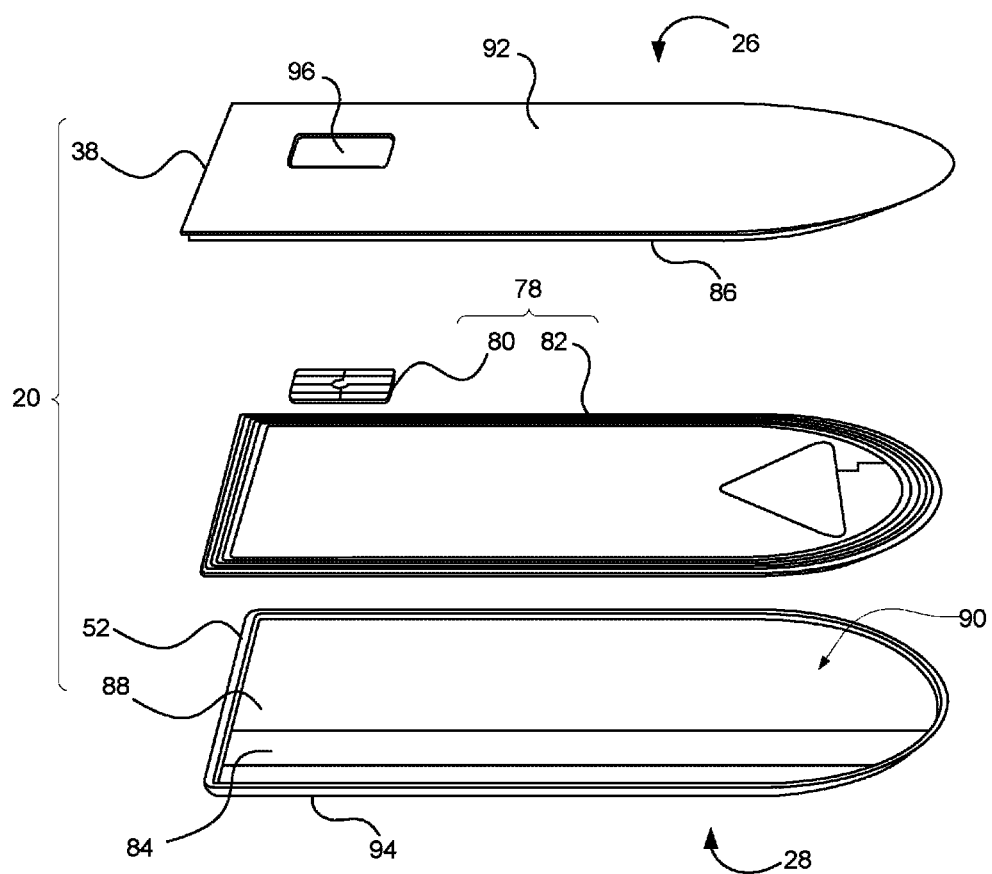
FIG. 7 is an exploded-view illustration of an exemplary transaction card, consistent with disclosed embodiments.

In some embodiments, card 20 may be formed of multiple components configured to encase, enclose, or at least partially contain certain other components of card 20. For example, as shown in FIG. 7 first card component 38 and second card component 52 may be separate components configured to at least partially contain one or more data storage component(s) 78, such as a microchip 80, an NFC antenna 82, and/or a magnetic stripe 84 (e.g., magnetic stripe 82 may be configured to communicate or transmit data through first and/or second card component 38, 52). First and second card components 38 and 52 may include a first inner surface 86 and a second inner surface 88, respectively, configured to at least partially define an interior cavity 90 that houses or at least partially contains data storage component(s) 78. First card component 38 may also include a first outer surface 92 opposite first inner surface 86, and second card component 52 may include a second outer surface 94 opposite second inner surface 88. First card component 38 may also include an aperture 96 configured to enable microchip 80 to be engaged (e.g., mechanically, electrically, magnetically, electromagnetically, via radio frequency transmission, etc.). In other embodiments, second card component 52 may also or alternatively include aperture 96.

Figure 8:
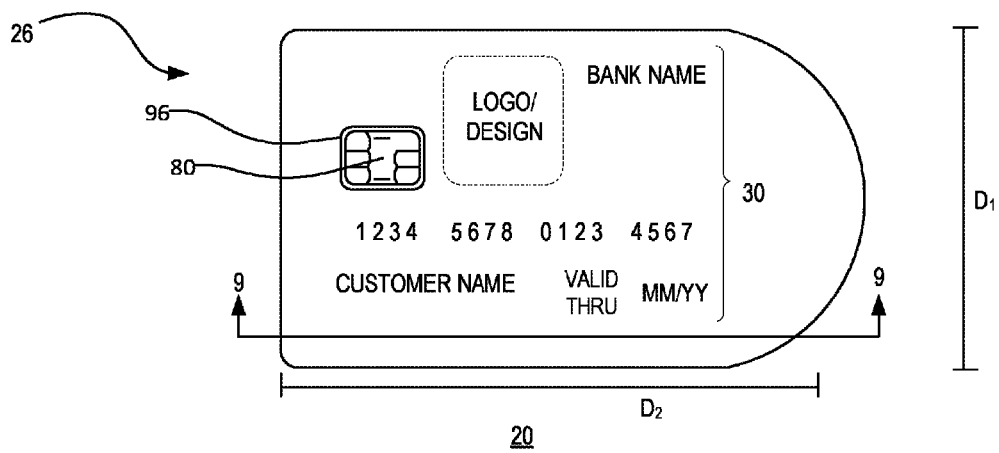
FIG. 8 is a front view illustration of the transaction card of FIG. 7.
Figure 9A:
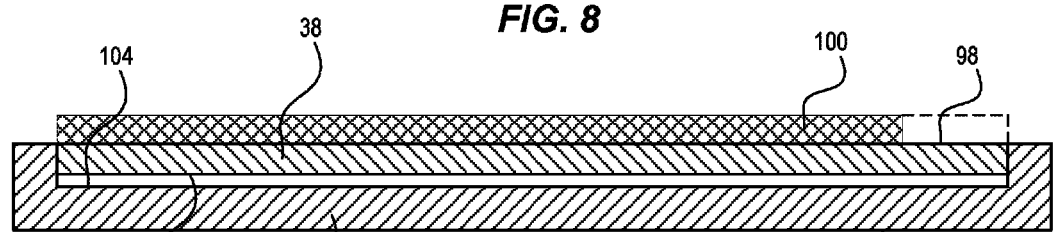
FIG. 9A is a cross-sectional view illustration along line 9-9 of FIG. 8.

FIG. 8 shows a front view illustration of the embodiment of card 20 of FIG. 7 having cross-section line 9-9. FIG. 9A shows a partially cut-away cross section of an exemplary embodiment of card 20 taken along section line 9-9 of FIG. 8. As shown in the example of FIG. 9A, card 20 may include first card component 38 and second card component 52 attached to first card component 38 (e.g., via a suitable joining mechanism, such as an adhesive, snap fit features, lamination, fasteners, interconnecting features, and/or other types of joining techniques).

As shown in FIG. 9A, first card component 38 of card 20 may have a first electrically conductive surface 98 defining a first outer surface and a first electrically applied coating 100 disposed on first electrically conductive surface 98. First card component 38 may also have a first inner surface 102 configured to be joined to second card component 52. Second card component 52 may include a second inner surface 104 configured to be joined to first card component 38 and a second outer surface 106 opposite second inner surface 104.

As shown in FIG. 9A, first card component 38 may be formed of an electrically conductive material (such as any of the electrically conductive materials discussed above) that provides first electrically conductive surface 98. First electrically conductive surface 98 may be configured to receive first electrically applied coating 100, which may be any of the electrically applied coatings discussed above.

Second card component 52 may be formed of a material configured to enable data storage component(s) 78 to exchange, transmit, send, receive, or otherwise communicate data there through. That is, some materials (e.g., certain metals) may inhibit or prevent data communication conducted via magnetic, electromagnetic, electric, radiofrequency, infrared, and/or other communication mechanisms, and second card component 52 may be formed of a material configured to enable or permit such communication. For example, second card component 52 may be formed of non-metal materials, such as injection molded or compression molded plastic, wood (i.e., natural wood) or wood-containing material (i.e., materials that contain natural wood and/or other non-wood components), epoxy, fabric, rubber, ceramic, etc., but is not limited thereto. In this way, and in addition to enabling the achievement of tailored mechanical properties of card 20 (as similarly discussed above), the multi-component card construction of FIG. 9A may permit desired visual and tactile qualities to be achieved via first electrically applied coating 100 while enabling data communication between data storage component(s) 78 and other devices through second card component 52. Thus, data storage component(s) 78 may be protected from wear and tear while desired mechanical, visual, and tactile characteristics may be achieved.

Figure 9B:
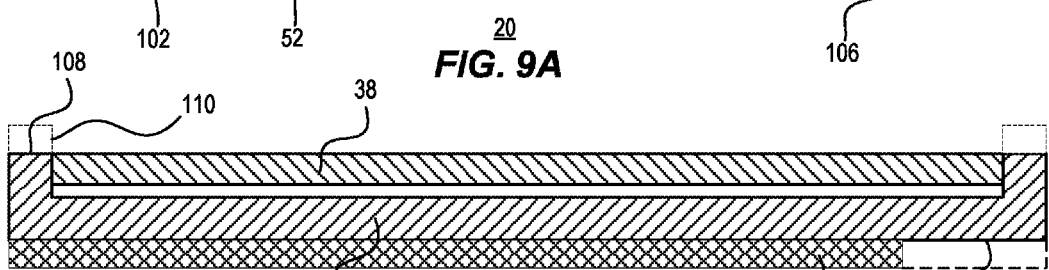
FIG. 9B is another cross-sectional view illustration along line 9-9 of FIG. 8.

In other embodiments, as shown in FIG. 9B, second card component 52 may be formed of an electrically conductive material (such as any of the electrically conductive materials discussed above) that provides first electrically conductive surface 98. First electrically conductive surface 98 may be configured to receive first electrically applied coating 100, which may be any of the electrically applied coatings discussed above. Second card component 52 may also include a lip section 108 that may optionally be coated with an electrically applied coating 110 (shown in dashed lines), which may be the same or different than first electrically applied coating 100. In some embodiments, the surface (or at least a portion of) lip section 108 may be raised above the surface of first card component 38. In other embodiments, the application of electrically applied coating 110 to lip section may cause lip section 108 to be raised above the surface of first card component 38. In this way, the surface of first card component (which may include first electrically applied coating 100) may be protected from scratching or other wear and tear when card 20 is used (i.e., swiped or inserted into a card reader), dropped, slid across a surface (such as a counter, desk, or table), etc. In this way, lip section 108 and electrically applied coating 110, the material of which may be specifically selected for such protection purposes (e.g., as opposed to achieving other desired visual or tactile qualities), may enhance the service life of card 20.

Referring still to FIG. 9B, first card component 38 may be formed of a material configured to enable data storages component(s) 78 to exchange, transmit, send, receive, or otherwise communicate data there through. That is, first card component 38 may be formed of a material configured to enable or permit such communication. For example, first card component 38 may be formed of non-metal materials, such as injection molded or compression molded plastic, wood (i.e., natural wood) or wood-containing material (i.e., materials that contain natural wood and/or other non-wood components), epoxy, fabric, rubber, ceramic, etc., but is not limited thereto. In this way, and in addition to enabling the achievement of tailored mechanical properties of card 20 (as similarly discussed above), the multi-component card construction of FIG. 9B may permit desired visual and tactile qualities to be achieved via first electrically applied coating 100 (and/or second electrically applied coating 110) while enabling data communication between data storage component(s) 78 and other devices through first card component 38. Thus, data storage component(s) 78 may be protected from wear and tear while desired mechanical, visual, and tactile characteristics may be achieved.

Figure 9C:
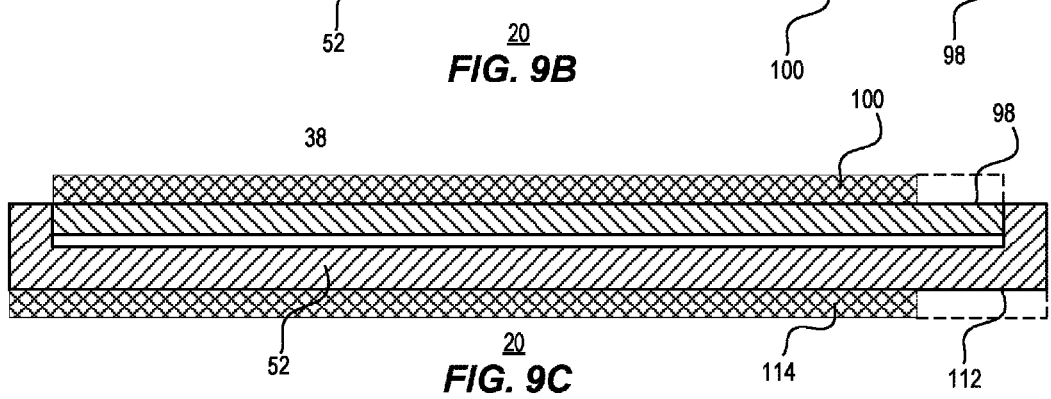
FIG. 9C is another cross-sectional view illustration along line 9-9 of FIG. 8.

In other embodiments, card 20 may only include data storage component(s) that are configured to communicate data through metal or other electrically conductive materials. In such embodiments and with reference to FIG. 9C, both first and second card components 38 and 52 may be formed of electrically conductive materials, such as the same metal or a combination of different metals (such as those discussed above), which provide first electrically conductive surface 98 and second electrically conductive surface 112, respectively. First electrically applied coating 100 and a second electrically applied coating 114 may be disposed on first and second electrically conductive surfaces 98 and 112, respectively.

Figure 10:
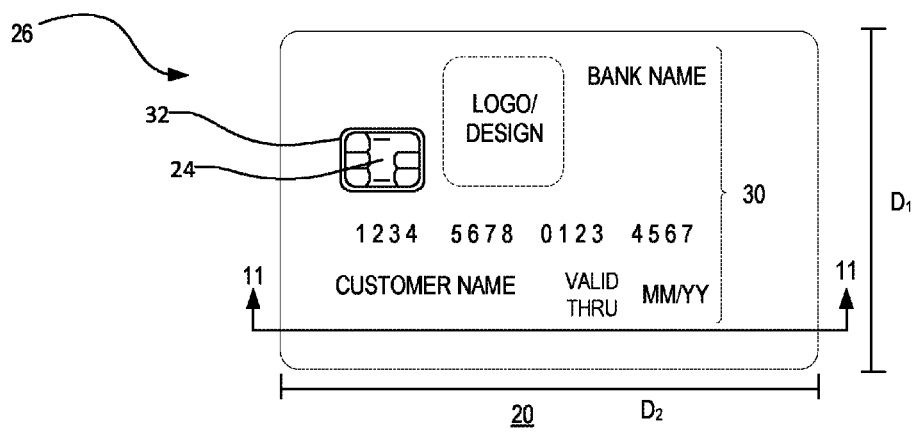
FIG. 10 is a front view illustration of an exemplary transaction card, consistent with disclosed embodiments.
Figure 11A:
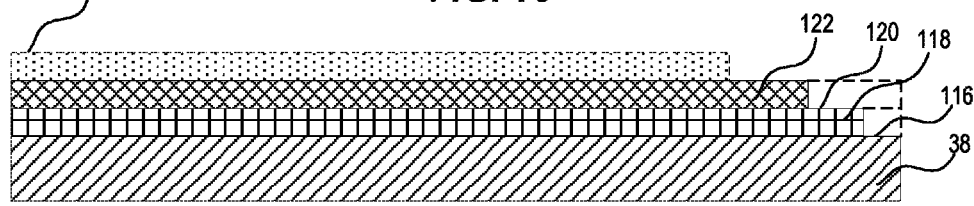
FIG. 11A is a cross-sectional view illustration along line 11-11 of FIG. 10.

In some embodiments, card 20 may be formed of electrically non-conductive components that are coated with electrically conductive materials to provide an electrically conductive surface configured to receive an electrically applied coating. For example, FIG. 10 shows a front view illustration of an exemplary embodiment of card 20 having cross-section line 11-11. FIG. 11A shows a partially cut-away cross section of an exemplary embodiment of card 20 taken along section line 11-11 of FIG. 10. As shown in the example of FIG. 11A, card 20 may include first card component 38. First card component 38 may be formed of an electrically non-conductive material or substrate, such as any of the electrically non-conductive materials discussed above. First card component 38 may include a first base surface 116 that may be coated with a first electrically conductive material 118.

First electrically conductive material 118 may be any electrically conductive materials configured to receive an electrically applied coating, such as any of the electrically conductive materials described above. For example, in some embodiments, first electrically conductive material 118 may be a thin material, such as a metal sheet, a metal foil, a layer of metal material applied using a dip coating, spray-on coating, or another type of coating. In other embodiments, first electrically conductive material may be a metal plating, an electrically conducive ink, electrically conductive paint (e.g., metallic paint), and/or another type of electrically conductive material. First electrically conductive material 118 may be deposited on the entirety of first base surface 116 or only a portion thereof—such as in shapes, patterns, or to form portions of visible information 30. First electrically conductive material may adhere mechanically or chemically to first base surface 116. First electrically conductive material 118 may provide a first electrically conductive surface 120, which defines a first outer surface. In this way, electrically non-conductive materials, which may be cheaper or exhibit desirable mechanical properties, may form at least a portion of card 20. This may allow the use of a broader range of materials while reducing the cost of card 20, without limiting the range of visual and/or tactile properties that may be achieved by using electrically applied coatings.

A first electrically applied coating 122 may be deposited on first electrically conductive surface 120 using any of the types of electrical application processes discussed above. To protect electrically applied coating 122 and/or to provide additional visual or tactile effects, a coating layer 124 may be optionally applied to electrically applied coating 122. Coating layer 124 may be an opaque, clear, transparent, translucent, or otherwise non-opaque coating. In some embodiments, coating layer 124 may be or comprise, for example, an acrylic, epoxy, urethane, polyurethane, sealant, paint, stain, or other type of coating material. In other embodiments, coating layer 124 may be an additional (e.g., a second) electrically applied material (i.e., in addition to electrically applied coating). For example, when electrically applied coating 122 comprises a conductive material, coating layer 124 may be or comprise an electrically applied material (e.g., an electrically applied coating), such as any of the electrically applied coatings discussed above. Although coating layer 124 is shown in the example of FIG. 11A, it is noted that coating layer may be applied to any embodiment disclosed herein. It is also noted that in some embodiments, coating layer 122 may be applied to multiple sides of card 20, whether or not such side(s) are first coated with an electrically applied coating.

Figure 11B:
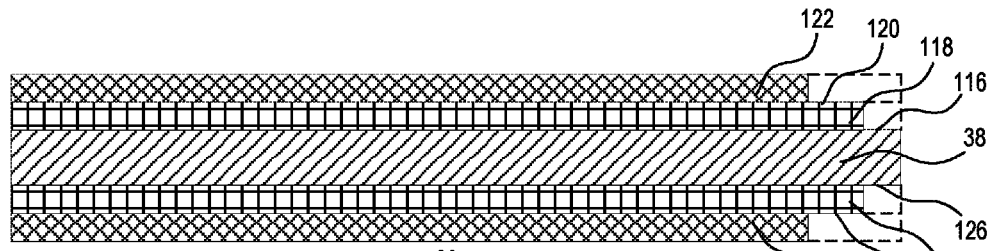
FIG. 11B is another cross-sectional view illustration along line 11-11 of FIG. 10; and 11C is another cross-sectional view illustration along line 11-11 of FIG. 10.

FIG. 11B shows the example of FIG. 11A wherein a second base surface 126 of first card component 38 is coated in the same way as first base surface 116. That is, second base surface 126 may be coated with a second electrically conductive material 128, which may be the same as or different from first electrically conductive material 118. Successive layers are possible, as long as the outer surface is conductive or any interposed layers do not preclude deposition on the successive layer. Second electrically conductive material 128 may be deposited on the entirety of second base surface 126 or only a portion thereof—such as in shapes, patterns, or to form portions of visible information 34 (referring to FIG. 2B). Second electrically conductive material 128 may provide a second electrically conductive surface 130 configured to receive a second electrically applied coating 132. In this way, one or more of the above-mentioned types of electrically applied coatings may be deposited onto card 20; one onto first electrically conductive surface 120, and another on second electrically conductive surface 130. As a result, various combinations of different electrically applied coatings providing different levels of wear resistance, mechanical properties, electrical properties, tactile responses, appearances, etc., can be achieved on a single card.

Figure 11C:
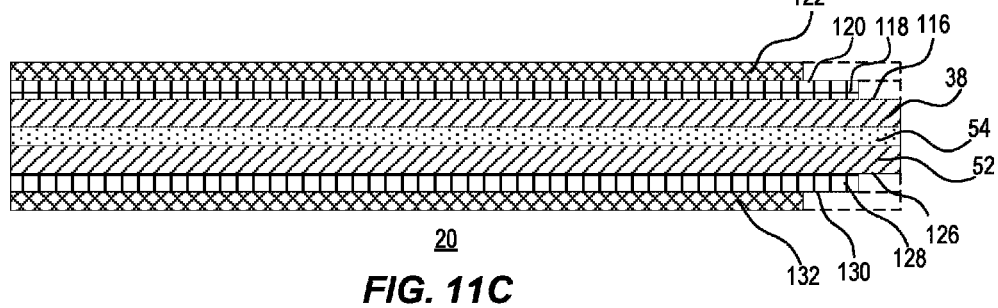

FIG. 11C shows the example of FIG. 11A, further including second card component 52 connected to first card component via adhesive layer 54. As shown, the embodiment of FIG. 11C, an outward-facing surface of second card component 52 may form second base surface 126. Second base surface 126 may be coated with a second electrically conductive material 128 defining a second outer surface. Second electrically conductive material 128 may be the same as or different than first electrically conductive material 118. In this way, second electrically conductive material 128 may provide a second electrically conductive surface 130 configured to receive a second electrically applied coating 132. Second electrically applied coating 132 may be the same or different than first electrically applied coating 122.

The embodiment of FIG. 11C may enable first and second card components 38 and 52 to be prepared or manufactured separately, which may allow first and second card components 38 and 52 to be more efficiently coated using different application processes. That is, while first card component 38 is being coated with first electrically conductive material 118 and first electrically applied coating 122 using a first set of coating processes, second card component 52 may be coated with second electrically conductive material 128 and second electrically applied coating 132 using a different set of coating processes, which may require the use of different equipment or may take place at a different facility or different location within a facility. Thus, downtime and cost can be reduced by allowing both components 38 and 52 to be formed separately and simultaneously. Once coated, first and second card components 38 and 52 can be joined to form card 20.

In some embodiments, one or more outer surfaces of card 20 may be post-processed to achieve desired visual or tactile properties. For example, outer surfaces of card 20 may be etched, engraved, scored, inscribed, or otherwise mechanically or chemically processed after being formed. Outer surfaces of card 20 may include, for example, electrically conductive surface 40, 44, 48, 56, 66, 72, 98, 112, 120, and 130. In some embodiments, outer surfaces of card 20 may also include surfaces of electrically applied coating 42, 46, 50, 58, 68, 74, 100, 114, 122, 132. In other embodiments, outer surfaces of card 20 may include surfaces of first card component 38 and/or second card component 58.

Post-processing of outer surfaces of card 20 may include machining, processes, chemical processes, and or other processes. For example, post-processing may include die casting, milling, stamping, sanding, sandblasting, scoring, buffing, polishing, hammering, knurling, brushing, perforating, mechanical etching or inscribing, chemical etching, etc. Post-processing may be conducted using manually operated equipment or computer operated equipment, such as computer numerical control (CNC) machines. Post-processing may be performed on any of the outer surfaces mentioned above, after their respective formation.

Several advantages of the present disclosure may be realized through the implementation of its embodiments. By forming card components of electrically conductive material, less expensive materials having more desirable mechanical properties may be used, thereby lowering the cost to manufacture card 20. Further, the ability of the selected material to receive various types of electrically applied coatings may allow a single type of material (or a limited selection of materials) that satisfy the mechanical and cost requirements of card 20 to be used in forming cards with widely varying visual and tactile properties. This may greatly simplify the process of manufacturing card 20 by reducing the number of different types of machines and tools for handling different materials, reduces the complexity of the raw material supply chain, allows for more predictable and consistent quality, and ensures applicable standards can be met by all types of cards produced. As a result, higher quality cards may be produced at a lower cost with greater variability in visual and tactile qualities.

What is claimed is:

1. A transaction card, comprising:
   a first card component defining a first side of the transaction card and having an electrically conductive surface configured to receive an electrically applied coating;
   an electrically applied coating formed on the electrically conductive surface of the first card component;

a second card component joined to the first card component by a snap fit feature, the second card component defining a second side of the transaction card,
wherein the first and second card components are configured to define an interior cavity; and
a data storage component disposed within the interior cavity,
wherein at least one of the first or second card component is configured to enable communication between the data storage component and another device.

2. The transaction card of claim 1, wherein:
the data storage component comprises an EMV chip; and
the transaction card further comprises an aperture configured to enable communication between the EMV chip and an associated device.

3. The transaction card of claim 1, wherein the data storage component comprises a magnetic strip joined to the second card component.

4. The transaction card of claim 1, wherein the second card component is configured to enable the data storage component to communicate with an associated device external to the transaction card.

5. The transaction card of claim 1, wherein the first card component comprises metal, and the second card component comprises plastic.

6. The transaction card of claim 1, wherein:
the first card component comprises an electrically conductive material applied to a substrate, and
wherein the electrically conductive material applied to the substrate comprises one of a metal plating, an electrically conductive foil, a printed conductive ink, or an electrically conducive paint.

7. The transaction card of claim 6, wherein the substrate comprises at least one of a metal or a plastic.

8. The transaction card of claim 1, wherein the electrically applied coating comprises at least one of an electrostatically applied coating, an electrophoretic deposition coating, an electroplated coating, an anodized coating, or a powder coated layer.

9. The transaction card of claim 1, further comprising a coating layer disposed on the electrically applied coating, and wherein the coating layer comprises a non-opaque electrically applied material.

10. A method of manufacturing a transaction card, the method comprising:
forming a first card component defining a first side of the transaction card and having an electrically conductive surface configured to receive an electrically applied coating;
forming an electrically applied coating on the electrically conductive surface of the first card component;
forming a second card component defining a second side of the transaction card;
joining the second card component to the first card component by a snap fit feature,
wherein the first and second card components are configured to define an interior cavity; and
disposing a data storage component within the interior cavity;
wherein at least one of the first or second card component is configured to enable communication between the data storage component and another device.

11. The method of claim 10, wherein:
the data storage component comprises an EMV chip; and
the transaction card further comprises an aperture configured to enable communication between the EMV chip and an associated device.

12. The method of claim 10, wherein the data storage component comprises a magnetic strip joined to the second card component.

13. The method of claim 10, wherein the second card component is configured to enable the data storage component to communicate with an associated device external to the transaction card.

14. The method of claim 10, wherein the first card component comprises metal, and the second card component comprises plastic.

15. The method of claim 10, wherein:
forming the first card component comprises applying an electrically conductive material to a substrate, and
wherein the electrically conductive material applied to the substrate comprises one of a metal plating, an electrically conductive foil, a printed conductive ink, or an electrically conducive paint.

16. The method of claim 15, wherein the substrate comprises at least one of a metal or a plastic.

17. The method of claim 10, wherein the electrically applied coating comprises at least one of an electrostatically applied coating, an electrophoretic deposition coating, an electroplated coating, an anodized coating, or a powder coated layer.

18. The method of claim 10, further comprising disposing a coating layer on the electrically applied coating, wherein the coating layer comprises a non-opaque electrically applied material.

* * * * *